July 9, 1963 A. C. PETERSON 3,096,974
VEHICLE RESILIENT SUSPENSION MEANS
Filed April 19, 1960 2 Sheets-Sheet 1

INVENTOR.
Adolph E Peterson.

July 9, 1963

A. C. PETERSON 3,096,974

VEHICLE RESILIENT SUSPENSION MEANS

Filed April 19, 1960

INVENTOR.

Adolphe Peterson.

United States Patent Office

3,096,974
Patented July 9, 1963

3,096,974
VEHICLE RESILIENT SUSPENSION MEANS
Adolphe C. Peterson, 4623 Bruce Ave. S.,
Minneapolis, Minn.
Filed Apr. 19, 1960, Ser. No. 23,338
13 Claims. (Cl. 267—65)

My invention relates to means for vehicle suspension and is of the class embodying air suspension, and is called, Vehicle Resilient Suspension Means.

The chief objects of my invention are to provide a means of vehicle suspension, which shall be simple in construction, relatively cheap in manufacture, and effective in use. A principal object is to provide a means for the purpose stated, which means shall adapt for general automotive vehicle use, a spring means of the pneumatic type, so that such a means with the attendant advantages, especially in comfortable riding, may be generally used for such purposes. An object is to provide such a means, in a form, such that the repair or renewal of units of the air containing means may not only be easily and cheaply manufactured, but so that such units may in case of injury, be easily replaced, without much inconvenience even when a vehicle is on a highway and incapacitated by such injury to units. An object is to provide such a means in a form which utilizes a simple and cheaply constructed installation means or support means for the air cells of the device, so that such support or installation means may be economically and readily incorporated with any of the customary chassis and wheel supporting means as used in vehicles. In general the object is to provide an improved form of air spring means for automobiles, trucks, and the other classes of vehicles which utilize the highways and roads.

The principal devices and combinations of devices comprising my invention, are as hereinafter described and as claimed in the accompanying claims. In the accompanying drawings which illustrate my invention with several forms of the installation or support means, like characters refer to like parts in all the views in so far as practicable.

FIGURE 1 is a view in vertical or side elevation showing one spring unit, as used in my device, looking from the same point of view, as in FIG. 2, some parts broken away, one part in section on the same line as the section of FIGURE 2.

FIGURE 2 is a view chiefly in vertical cross section on a plane passing vertically through the axial center of the principal units constituting the air spring unit, the section being on the same plane as the section of one part in FIGURE 1, some parts being broken away, some parts being shown in full side elevation, the section being on line 2—2 of FIG. 3.

FIGURE 3 is a plan view of the suspension of one road wheel of a vehicle including two of the air spring units as shown in FIGURES 1 and 2, and including the support of the bracket means on the vehicle chassis frame and the bracket means on the road wheel axle, between which the two air spring units are installed, parts of the chassis frame member being broken away.

Figure 2:
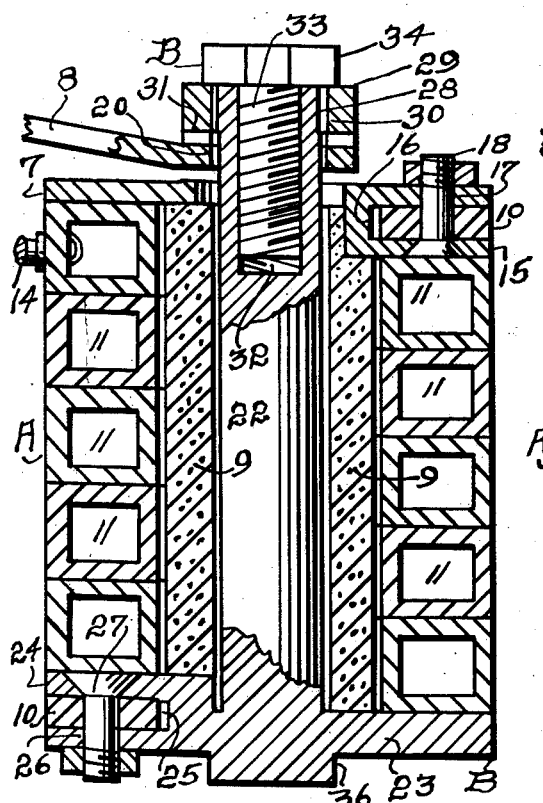
FIGURES 1 to 6 illustrate one form of my invention, and referring thereto.
Figure 3:
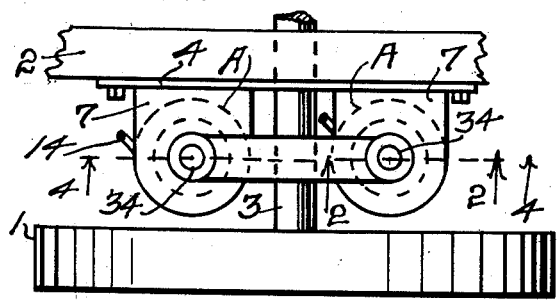
Figure 4:
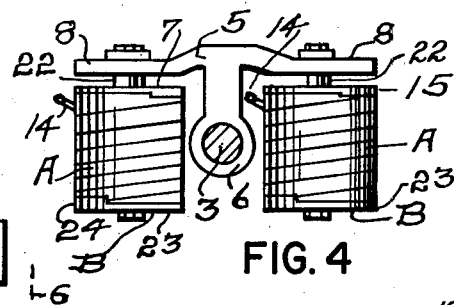

FIGURE 4 is a view in side elevation, looking from the bottom of FIG. 3 of the two air spring units of FIGURE 3 and the bracket support means for the units, the part in section being a section on the line 4—4 of FIGURE 3, some parts being broken away. FIGURES 3 and 4 are views on a much reduced scale as compared with FIGURES 1 and 2.

Figure 5:
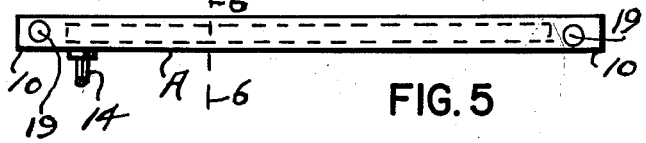
Figure 6:
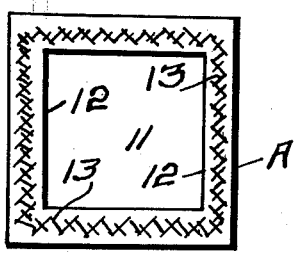

FIGURES 5 and 6 are views of one air cell, as used with the device, FIGURE 6 being on a much larger scale than that of FIGURE 5 or of this part as shown in any of the figures, FIGURE 5 showing the one cell extended in full length, that is not in the spiral arranged position, as in FIGURES 1, 2, 3, 4. FIGURE 6 shows a cross section through the cell shown in FIGURE 5, on line 6—6 of FIGURE 5, the fabric or cord textile material or core being in section, and the embedding rubber or flexible cover being on the same section, but not cross-hatched, so as to show the fabric material insert, more clearly.

Figure 1:
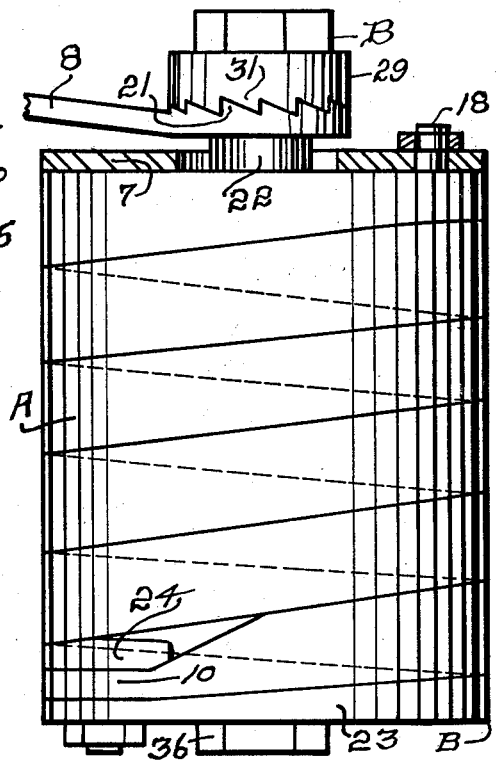
Figure 7:
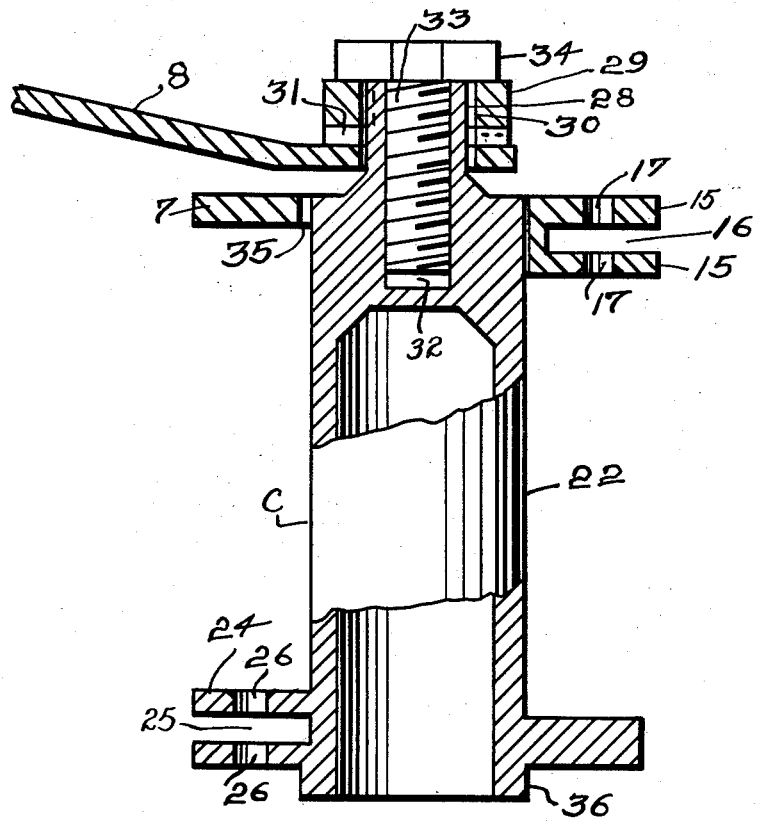

FIGURE 7 is a view of a cross section on a line, the same as that of FIGURE 2, showing only the bracket or installation elements for an air spring unit of the same type as that shown in FIGURES 1 and 2, this figure showing, however, a modified form of the shelf air cell supporting element.

Figure 8:
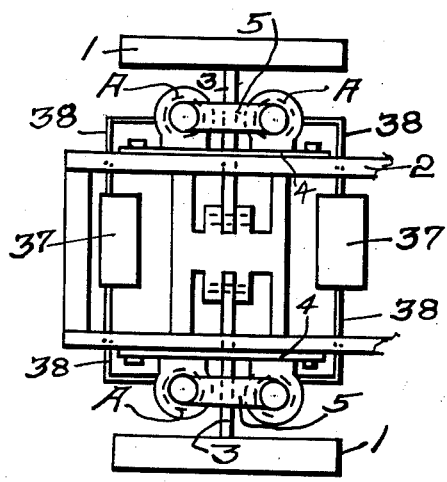

FIGURE 8 is a view on a much reduced scale showing use of my air spring means on a chassis with two road wheel suspension means.

Reference is first made to FIGURES 3 and 4 wherein there are shown, a road wheel 1, one side rail 2 of an automobile chassis frame, one end of a road wheel axle 3, a chassis bracket member 4 having two sideways extending horizontal bracket shelves by which the chassis frame rests on two air spring units, one axle bracket 5 fixed by depending fixture 6 on the road wheel axle 3, the bracket member 4 having the shelves designated as 7 and the axle bracket 5 having the horizontally extending bracket limbs 8. The bracket shelves 7 and the axle bracket limbs 8 form the elements between which two air cells each designated generally as A are placed and serve as the yieldable means between the chassis frame and the road wheel axle.

One of the air cells A is illustrated on an enlarged scale in FIGURES 1 and 2, and reference is now made to those figures. In FIGURES 1 and 2 there is one air cell shown, this air cell being formed as an elongated flexible unit of a length such that it can be wrapped several times around a foam rubber or other solid rubber sleeve 9, FIGURES 1, 2, and it is relatively of small width or thickness in either direction transversely of the air cell unit. As shown in FIGURES 1, 2, the air cell A may be as long as twelve to fifteen times the width, in either direction, of the air cell. The air cell has formed at each of its ends a solid section, that is interior space-less section 10, at each end, and this section, called a mounting section, serves not only to mount the air cell in its installation brackets, but serves also to firmly close the air-space 11 of the remainder of the unit, that is the long part intermediately of the two ends 10, the mounting sections. The air-spase 11 of the air-cell A is one long uninterrupted air-space, closed at both ends, and formed as a relatively rectangular space, in cross-section, by the rather firm but flexible rubber-encased cord- or textile side-wall 12 of the air-cell unit A. It should be noted especially, that the air-cell unit in cross-section, transversely of the unit, at any part of its air-space length, is of rectangular form and relatively firm although flexible in its wall structure, so that in compression transversely of the air-cell unit, the relative rectangular form will be well-sustained although it may be compressed transversely of the structure. The wall-structure of the air-cell unit A would be formed of a rubber such as the customary vehicle tire is formed, to retain air and to resist friction and wear, and so that its basic structure, the cord or fabric or textile base 13 is likewise formed substantially as the similar base structure in a pneumatic automobile tire is formed, and it may be formed of rayon, or nylon, or cotton or any suitable fibrous material. The air-cell A has inserted firmly in its side-wall, and securely attached therein, an air-connection element 14 which may be merely a tube-end for connection with an air supplying tube for delivery of air under pressure, or for flow of air in either direction, to or from the air-cell space 11, or it may be merely the ordinary tire-valve structure for connection to supply air. Which it is will depend on whether it will be used with a means to constantly supply or equalize air-pressure or modulate it, or whether it will merely be used to inflate with air under pressure, as that may be required.

Each of the bracket shelves 7, that is, that for each air-cell A, has formed in one side edge of the shelf, a mounting or affixing device 15 which is formed to have a relatively thin U shaped (U on its side) groove 16 and bolt-holes 17 bored through the side-members of the U shaped device, whereby one of the ends 10 of an air-cell A may be inserted therein and a bolt 18 passed through the bolt-holes 17 and the bolt-hole 19 in the end of the air-cell unit A.

Each of the bracket limbs 8 is formed with an aperture 20 vertically bored therethrough, and is formed also to have on the upper side of the limb 8 one part 21 of ratchet form to cooperate with another ratchet means as hereinafter described.

Another unit, generally designated as B, is necessary for each air-cell A, to form a link between the associated bracket limb 8 and the under-side of the air-cell unit A, and this link B is formed of a vertical axial post or rod 22 having formed therewith at its lower end, to be relatively at right angles to its axis, a round shelf 23 wherein there is formed at one side edge a mounting or affixing device 24, which is somewhat similar to the device previously described as 15 and which has a U-shaped (on its side) socket or groove 25 and bolt-holes 26 through the sides of the U-shaped socket, wherein an opposite end 10 of an air-cell A may be inserted and bolted in place by a bolt 27. The upper end of the rod 22 of the unit B, has formed exteriorly of it a toothed circumference 28 which will circumferentially secure an exteriorly mounted ratchet part 29 by its internal teeth 30. The ratchet part 29 has on its underside the ratchet teeth 31 which are engaged in ratchet fashion with the ratchet 21 on the upper side of the associated limb 8. The upper end of the rod 22 has formed downwardly therein a screw-threaded bore 32 wherein a bolt 33 having a large head 34 may be tightly screwed. The rod 22 is in the nature of a guide post as well as a core and it may for purposes of description in the claims be designated as a "core means" and this designation may include merely the part 22 as in FIGURE 7 or it may also include the core or post 22 as well as the member 9 intermediately of it and the air cell A.

The rubber sleeve 9 is placed exteriorly of the rod 22 so that it will form a somewhat yieldable base interiorly of the air-cell A when the latter is wound around it. In the assembly of the elements or units of my device, all elements except the air-cells A and the bolts to secure them, are placed and secured in position as shown, that is on the chassis frame and the road wheel axle, and the end of the chassis frame is placed on a jack or any supporting means, to keep it elevated, as when a pneumatic road wheel tire is mounted. The air-cell A, of which there are two for each road wheel, is without air-pressure, then, in the air space 11, and an air-cell A is then wound spirally around the rubber sleeve 9, one end first being bolted by a bolt in the U shaped socket of either the shelf 7 or the shelf 23. The air-cell A is wound, as shown in FIGURES 1 and 2, about five times, more or less, about the foam rubber sleeve 9, and the other remaining end of the air-cell is then bolted by a bolt in the socket formed in the other of the shelves 7 and 23.

When an air-cell A is bolted, as stated, in place, it forms a spiral shaped member spiraling around the foam rubber sleeve 9 and the rod 22, and the convolutions are in succession mounted, each upper on a lower one or one the shelf 23 (as to the lower), and the flat upper or lower sides of the convolutions of the air-cell A, rest one on the other and the foam rubber sleeve aids in retaining the spiraling position of the air-cell. When so placed, the air-cell is inflated by any means, either a common air supply means and control means, as hereinafter set out, or by means of a tire pump means, as tires are inflated, the air connection being made at the device 14. The air-pressure may be any suitable pressure, as in tires, say twenty to fifty pounds or even more, depending on the construction, and relative sizes.

Referring to FIGURES 3 and 4, it will be seen that one axle bracket 5 supports the axle by two air-cells A mounted on two of the units B which suspend the chassis frame on the road wheel axle. The devices 14 may connect with one common air pressure supply means and control means. Such means are commonly known and used, and such means is not particularly shown but only diagrammatically (FIGURE 8).

Referring now to FIGURE 7, there is here shown a mounting means for an air-cell A, similar to the mounting means shown in FIGURES 1, 2, 3, 4, except that the post 22 is made so large in diameter that the foam rubber sleeve 9, is unnecessary for this form of mounting, and the air-cell A is then wound spirally about the exterior cylindrical surface C of the rod or post 22, and the post 22, and the upper end of the surface C slides upwardly through the aperture 35 of the shelf 7, that is in compression movement of the air spring means. In some constructions this enlarged cylindrical metal surface C of the post 22 would preferably be used, instead of the foam rubber sleeve 9, which is then dispensed with.

In assembling of the air-cell A with its mounting means, the unit B is turned by means of the member 36 formed on the bottom end of post 22. Thereby, when the air-cell A has been spirally wound in place, the post 22 may be turned, by any tool applied to member 36, and the ratchet member 29 will be turned on the ratchet on limb 8, so that the air-cell A may be given some tension or tightness in its winding about the post 22, so that thereby it is more securely held in place.

Referring to FIGURE 8, this figure shows a bracket air-cell mounting means, such as described, for each of two road wheels 1, and shows four of the air-cells A, two for each bracket means, and it shows also two air pressure reservoirs 37 and control means for supplying air, each of which is connected by the pipes 38 to the devices 14. While there is shown two such means 37, air reservoir and control means, there may be any type of such air supply and control means, common to all air-cells or any of them, such means being commonly known and used.

In use of the device, in the event that there is damage to an air-cell A, the air-cell may be replaced by a new cell in the same manner that the original cell was installed, that is by raising the car chassis, by any tool for that purpose, releasing the air-cell A by removal of the bolts 18 and 27, unwinding the air-cell from its position, then installing the new air-cell by the procedure as above described, the new air-cell being similarly spirally wound on tube or post 22, the bolts 18 and 27 being again inserted and tightened to hold the air-cell. I contemplate especially, that my form of air-cell air-spring means may be adapted for use by other mounting means without departing from the spirit and intent of my invention. The air-cell A may have any cross-sectional form which is deemed in any construction to be most suitable. The air-cell A may for the purpose of designation in the claims be designated as a gas container and it should be noted that the fluid to be contained therein may be designated as a gas and that the term may include any form of gaseous fluid such as air.

While I have shown specific detailed devices in the illustration, I contemplate that other detailed devices may be used in the realization of my invention, without departing from the spirit and contemplation thereof.

What I claim is:

1. In a vehicle chassis suspension means: a first support element fixed on a vehicle frame; a second support element fixed on a road wheel bearing element; a core means fixed on one of said support elements and located axially of one of the support elements; a gas container constructed of a flexible material, having an elongated form adequate to encircle said core means at least once; having at each end of the elongated form and extended therefrom a securing part formed in the extended container end, having intermediately of the pair of securing parts a wall enclosing and surrounding a gas space internally of the wall; a pair of securing means associated each with one of said support elements and one of said pair of securing parts to attach said gas container by said securing parts to said pair of support elements so that the gas container is extended from one to the other of said support elements and retained in position thereby encircling said core means at least once to form yieldable means for compression between said support elements.

2. The device as defined in claim 1 and: the securing means on each of said support elements being defined as comprised of a bifurcated member within which the associated securing part is attached.

3. The device as defined in claim 1 and: the securing means on each of said support elements being defined as comprised of a bifurcated member within which the associated securing part is attached by a component element passed through said bifurcated member and the associated securing part.

4. The device as defined in claim 1 and: the said wall enclosing said gas space having a wall structure formed of a flexible material non-porous to gas and containing tension resisting reeinforcement therein.

5. In a vehicle chassis suspension means: a first support element fixed on a vehicle frame; a second support element fixed on a road wheel bearing element; a core means fixed on one of said support elements and located axially of the support elements and by which the last named support element is suspended from the road wheel bearing element; a gas container constructed of a flexible material, having an elongated form adequate to encircle said core means at least once, having at each end of the elongated form and extended therefrom a securing part formed in the extended container end, having intermediately of the pair of securing parts a wall enclosing and surrounding a gas space internally of the wall; a pair of securing means associated each with one of said support elements and one of said pair of securing parts to attach said gas container by said securing parts to said pair of support elements so that the gas container is extended from one to the other of said support elements and retained in position thereby encircling said core means at least once to form yieldable means for compression between said support elements.

6. The device as defined in claim 5 and: the securing means on each of said support elements being defined as comprised of a bifurcated member within which the associated securing part is attached.

7. The device as defined in claim 5 and: the securing means in each of said support elements being defined as comprised of a bifurcated member within which the associated securing part is attached by a component element passed through said bifurcated member and the associated securing part.

8. In a vehicle suspension means: a first support bracket fixed on a vehicle frame; a second support bracket fixed on a road wheel bearing element; a core means extended vertically from one of said support brackets and having an annular shelf perpendicular to the core means and at the core means end; a gas container constructed of a flexible material, having an elongated form adequate to encircle said core means at least once, having at each end of the elongated form and extended therefrom a securing part formed in the extended container end, having intermediately of the pair of securing parts a wall enclosing and surrounding a gas space internally of the wall; a pair of securing means associated one with one of said support brackets and one with said annular shelf to attach said gas container by said securing parts between the one support bracket and the annular shelf so that the gas container is extended therebetween and retained in position thereby encircling said core means at least once to form yieldable means for compression.

9. The device as defined in claim 8 and: the securing means at each said location being defined as comprised of a bifurcated member within which the associated securing part is attached by a component element passed through said bifurcated member and the associated securing part.

10. In a vehicle suspension means: a first support bracket fixed on a chassis frame; a second support bracket fixed on a road wheel bearing element and having a pair of limbs one extended to each side horizontally of said bearing element; a first core means and a second core means each fixed to and suspended from one of said limbs and having at its lower end an annular shelf perpendicular to the core means and having the core means axially thereof; a first gas container constructed of a flexible material, having an elongated form adequate to encircle said first core means at least once, having at each end of the elongated form and extended therefrom a securing part formed in the extended container end, having intermediately of the pair of securing parts a wall enclosing and surrounding a gas space internally of the wall; a second gas container constructed of a flexible material, having an elongated form adequate to encircle said second core means at least once, having at each end of the elongated form and extended therefrom a securing part formed in the extended container end, having intermediately of the pair of securing parts a wall enclosing and surrounding a gas space internally of the wall; a pair of securing means for said first gas container one securing means being formed with said first support bracket and one being formed with the annular shelf of said first core means to attach the gas container by its securing parts between said first support bracket and said annular shelf so that the gas container is extended from the first support bracket to the annular shelf and retained in its position encircling the core means at least once to form yieldable means for compression between the first support bracket and the annular shelf; a pair of securing means for said second gas container one securing means being formed with said first support bracket and one being formed with the annular shelf of said second core means to attach the gas container by its securing parts between said first support bracket and said annular shelf so that the gas container is extended from the first support bracket to the annular shelf and retained in its position encircling the core means at least once to form yieldable means for compression between the first support bracket and the annular shelf.

11. The device as defined in claim 10 and: each said securing means for each said gas container being defined as comprised of a bi-furcated member within which the associated securing part is attached by a component element passed through said bi-furcated member and the associated securing part.

12. The device as defined in claim 10 and: each said gas container being further defined in that the wall enclosing said gas space has a wall structure formed of a flexible material non-porous to gas and containing tension resisting reenforcement therein.

13. In a vehicle suspension means: a first support element fixed on a vehicle frame; a second support element fixed on a road wheel bearing element; a core means fixed on one of said support elements and located axially of the support elements and by which the last named support element is suspended from the road wheel bearing element; a gas container constructed of a flexible material, having an elongated form adequate to encircle said core means at least once, having at each end of the elongated form and extended therefrom a securing part formed in the extended container end, having intermediately of the pair of securing parts a wall enclosing and surrounding a gas space internally of the wall; a pair of securing means associated each with one of said support elements and one of said pair of securing parts to attach said gas container by said securing parts to said pair of support elements so that the gas container is extended from one to the other of said support elements and retained in position thereby encircling said core means at least once to form yieldable means for compression axially of the core means between said support elements.

References Cited in the file of this patent

UNITED STATES PATENTS

| | | |
|---|---|---|
| 871,186 | Rosenzweig | Nov. 19, 1907 |
| 2,377,170 | Morgan | May 29, 1945 |
| 2,688,480 | Pierce | Sept. 7, 1954 |
| 2,842,358 | Nardi | July 8, 1958 |

FOREIGN PATENTS

| | | |
|---|---|---|
| 760 | Great Britain | Jan. 11, 1897 |